(12) United States Patent
Fukagawa et al.

(10) Patent No.: US 8,659,477 B2
(45) Date of Patent: Feb. 25, 2014

(54) BASE STATION DEVICE AND DISTANCE MEASURING METHOD

(75) Inventors: Takashi Fukagawa, Kanagawa (JP); Yasunari Kimura, Kanagawa (JP); Yoichi Nakagawa, Tokyo (JP); Hirohito Mukai, Tokyo (JP)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 13/059,363

(22) PCT Filed: Oct. 9, 2009

(86) PCT No.: PCT/JP2009/005276
§ 371 (c)(1),
(2), (4) Date: Feb. 16, 2011

(87) PCT Pub. No.: WO2010/041463
PCT Pub. Date: Apr. 15, 2010

(65) Prior Publication Data
US 2011/0140970 A1  Jun. 16, 2011

(30) Foreign Application Priority Data

Oct. 9, 2008  (JP) ................................. 2008-262873
Oct. 24, 2008  (JP) ................................. 2008-274524

(51) Int. Cl.
*G01S 5/14* (2006.01)
*G01S 5/02* (2010.01)
*G01S 13/78* (2006.01)
*G01S 13/76* (2006.01)

(52) U.S. Cl.
USPC .......................................................... 342/458

(58) Field of Classification Search
USPC .......... 342/458; 375/239, 343, 268, 271, 300, 375/302, 322, 364–369; 340/10.1, 10.3, 340/10.4, 10.42, 572.1
See application file for complete search history.

(56) References Cited

U.S. PATENT DOCUMENTS

| 5,938,780 | A | * | 8/1999 | Panis ............................ 714/724 |
| 2007/0018792 | A1 | * | 1/2007 | Taki et al. ................ 340/825.49 |
| 2008/0018521 | A1 | | 1/2008 | Sahinoglu | |

FOREIGN PATENT DOCUMENTS

| JP | 55-96470 | 7/1980 |
| JP | 1-219687 | 9/1989 |

(Continued)

OTHER PUBLICATIONS

English translation of JP 05297129 A.*

(Continued)

*Primary Examiner* — Jack W Keith
*Assistant Examiner* — Fred H Mull
(74) *Attorney, Agent, or Firm* — Dickinson Wright PLLC

(57) ABSTRACT

Provided are a distance measuring device and a distance measuring method which can easily distinguish a reflected signal from a desired tag from an unnecessary wave so as to improve the distance measuring accuracy even when IR-UWB is used for measuring a distance. The method uses a reader ID indicated by a code string formed by P bits (P is a natural number) for identifying a base station and a tag ID indicated by a code string formed by Q bits (Q is a natural number) for identifying a radio terminal. The method generates a unique word containing P pulses, each of which is ON/OFF-modulated depending on whether each of P bits indicating the reader ID is 1 or 0. The method generates a frame containing 2 M unique words and a burst containing Q frames. The method further outputs a transmission signal containing a plurality of bursts. A radio terminal Amplitude Shift Keying (ASK)—modulates the transmission signal depending on whether each of the Q bits indicating the tag ID is 1 or 0. The ASK-modulated signal is sampling-received at timings of different phases by 1/M (M is an integer not smaller than 1) of the transmission clock cycle.

9 Claims, 12 Drawing Sheets

(56) References Cited

FOREIGN PATENT DOCUMENTS

| | | |
|---|---|---|
| JP | 5-297129 | 11/1993 |
| JP | 2005-318553 | 11/2005 |
| JP | 2008-26310 | 2/2008 |
| WO | 2007/072563 | 6/2007 |

OTHER PUBLICATIONS

International Search Report dated Jan. 5, 2010.

* cited by examiner

| PREAMBLE | SFD | PHR | PAYLOAD |

FIG. 1
PRIOR ART

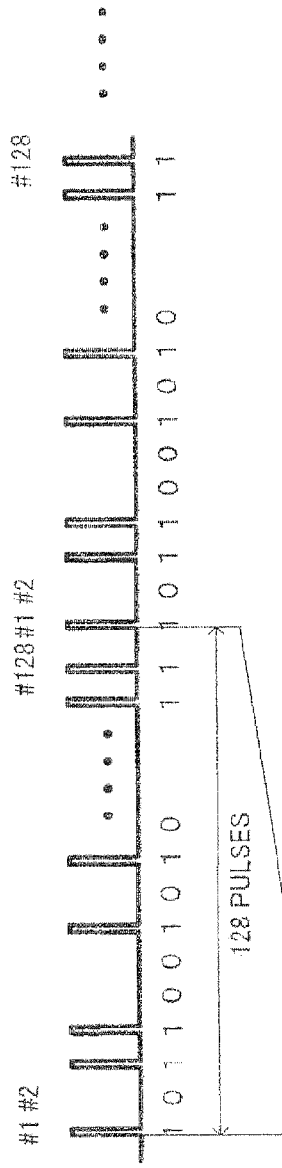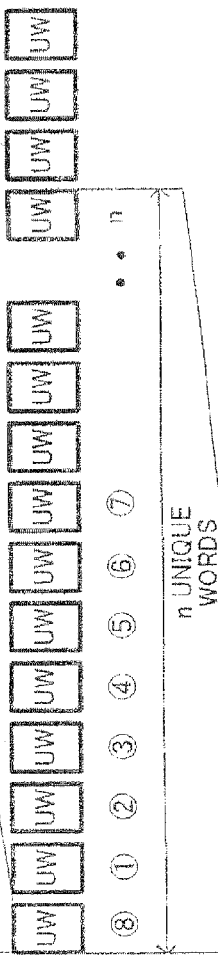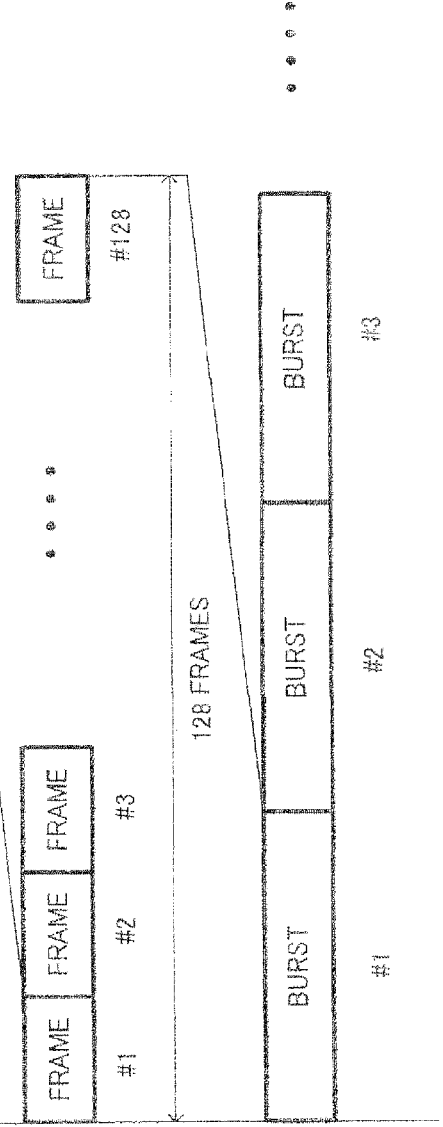

BASE STATION DEVICE AND DISTANCE MEASURING METHOD

TECHNICAL FIELD

The present invention relates to a base station apparatus and distance measuring method that measure a distance from a radio terminal in a radio distance measuring system that uses radio technology such as UWB (Ultra Wide Band) radio, for example.

BACKGROUND ART

In a radio distance measuring system, radio communication is performed between a radio terminal such as a tag and a base station such as a reader, a reflected signal in which an identification code (identification ID) of the radio terminal is multiplexed is received by the base station, and the propagation time, direction, and so forth, thereof are detected. By this means, distance measurement between a radio terminal and base station, and radio terminal position measurement, are performed. With this kind of radio distance measuring system, the characteristics of a radio wave used for measurement need to be taken into consideration when configuring the system in order to improve the reliability and accuracy of measurement results.

A known distance measuring apparatus executes a communication operation, distance measurement (ranging) operation, and passive radar operation (detecting a change or movement in the radio wave propagation environment, and tracking an object) using an IEEE802.15.4a packet, as disclosed in Patent Literature 1. The transmission format used in Patent Literature 1 is shown in FIG. 1. A reader detects the position or movement of a tag in the radio wave propagation environment by using a specific preamble structure contained in an IEEE802.15.4a packet.

A sequence of packets containing one preamble is received by the reader, and the preamble in each packet is despread. Then a reference multipath profile is updated, and a "current multipath profile" of a packet being received at the present time is obtained. An object in that radio wave propagation environment is detected by comparing this "current multipath profile" with the "reference multipath profile." Also, ground scatter—that is, a ground reflected wave that is the strongest of reflected waves in open ground without wall surfaces or the like—is eliminated, and the position, movement, and so forth of an object are detected.

Also, in Patent Literature 1, a method is disclosed whereby, in order to apply a UWB distance measuring apparatus to passive radar, a "current multipath profile" of each packet is found from a preamble in each packet following a received packet, and the "current multipath profile" is compared with a "reference multipath profile."

Since ground scatter assumed in a conventional configuration comprises ground reflections, if a large number of signals received by a reader are accounted for by ground reflected waves, a ground reflected wave is detected by the reader as a signal with a greater amount of delay than a reflected signal from a passive tag. Also, if the heights of a reader and tag are decided, a delay profile of a specific time domain can easily be eliminated based on a geographical relationship.

CITATION LIST

Patent Literature

PTL 1
Japanese Patent Application Laid-Open No. 2008-026310

SUMMARY OF INVENTION

Technical Problem

However, in actuality, with a passive method or semi-passive method, a radio wave propagation environment in which a reflected wave from a wall closer to a reader than a tag whose ID should be detected (a desired tag) is present, or a radio wave propagation environment in which a plurality of tags are present, is assumed. In such radio wave propagation environments, even if a first traveling wave that reaches a reader earliest is detected, the detected first traveling wave is not necessarily a reflected wave from a desired tag. That is to say, it is possible that a first traveling wave may be an unwanted wave. When IR-UWB is used for distance measurement, in particular, an unwanted wave and a reflected signal from a tag arrive sequentially as a plurality of pulses, and therefore, even if a first traveling wave is detected, a reflected signal from a tag and an unwanted wave cannot easily be distinguished from each other.

The present invention has been implemented taking into account the problems described above, and it is an object of the present invention to provide a base station apparatus and distance measuring method that can easily distinguish between a reflected signal from a desired tag and an unwanted wave, enabling distance measurement accuracy to be improved, even when IR-UWB is used for distance measurement.

Solution to Problem

A base station apparatus of the present invention is a base station apparatus in a radio distance measuring system that uses a reader ID represented by a code string composed of P bits (where P is a natural number) for identifying the base station apparatus and a tag ID represented by a code string composed of Q bits (where Q is a natural number) for identifying a radio terminal, wherein the base station apparatus employs a configuration having: a pulse generation section that generates a unique word containing P pulses, each of which is on/off modulated according to whether each of the P bits representing the reader ID is 1 or 0, generates a frame containing 2×M unique words, generates a burst containing Q frames, and outputs a transmission signal containing a plurality of bursts; and a receiving section that performs sampling reception of a signal resulting from modulation of the transmission signal by the radio terminal based on whether each of the Q bits representing the tag ID is 1 or 0 at timings with a phase difference of 1/M (where M is an integer not smaller than 1) of a transmission clock period.

A distance measuring method of the present invention is a distance measuring method in a base station apparatus of a radio distance measuring system that uses a reader ID represented by a code string composed of P bits (where P is a natural number) for identifying the base station apparatus and a tag ID represented by a code string composed of Q bits (where Q is a natural number) for identifying a radio terminal, wherein the distance measuring method generates a unique word containing P pulses, each of which is on/off modulated according to whether each of the P bits representing the reader ID is 1 or 0, generates a frame containing 2×M unique words, generates a burst containing Q frames, and outputs a transmission signal containing a plurality of bursts; and performs sampling reception of a signal resulting from ASK modulation of the transmission signal by the radio terminal based on whether each of the Q bits representing the tag ID is 1 or 0 at timings with a phase difference of 1/M (where M is an integer not smaller than 1) of a transmission clock period.

Advantageous Effects of Invention

The present invention enables a reflected signal from a desired tag to be easily distinguished from an unwanted wave, enabling distance measurement accuracy to be improved, even when IR-UWB is used for distance measurement.

BRIEF DESCRIPTION OF DRAWINGS

Figure 1:
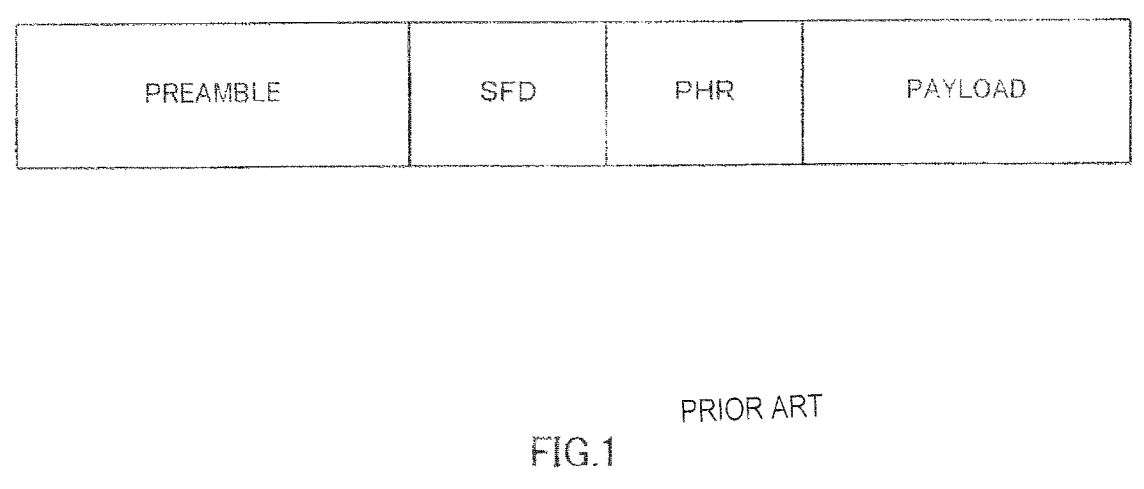

FIG. 1 is a drawing showing a transmission format described in Patent Literature 1;

FIG. 4 is a drawing showing an example of a transmission format transmitted by the reader shown in FIG. 3;

DESCRIPTION OF EMBODIMENTS

Now, embodiments of the present invention will be described in detail with reference to the accompanying drawings.

Figure 2A:
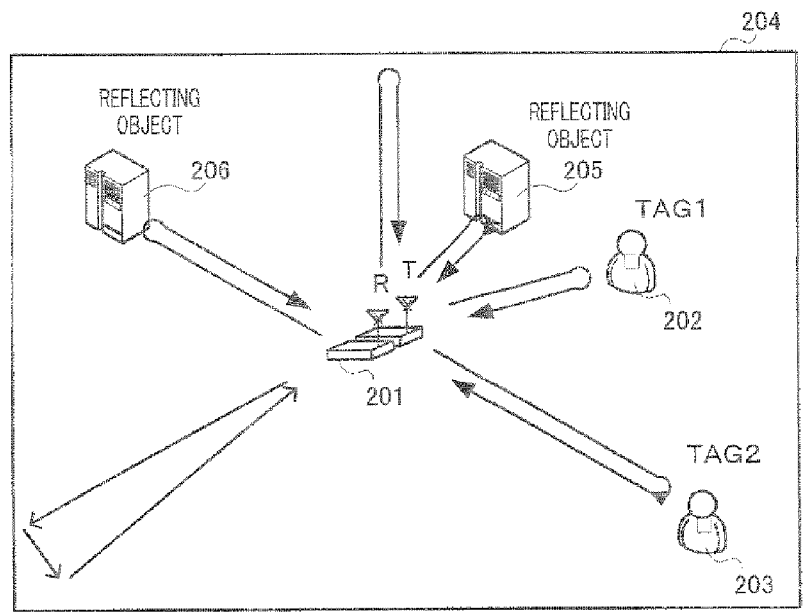
FIG. 2 is a drawing showing a radio wave propagation environment.

FIG. 2(a) is a schematic diagram showing an example of a radio wave propagation environment. It is hoped that a radio wave sent from reader (base station) 201, after having a tag ID for identifying desired tag (TAG1) 202 added by that tag, is then received by the reader again as a reflected signal. However, in an actual radio wave propagation environment, there are many other reflectors apart from the desired tag. Examples of other reflectors include other tag (TAG2) 203, wall 204, reflecting object 205 near the reader, and reflecting object 206 far from the reader. Reflected waves from these reflectors are detected as different delay profile peaks in a delay profile observed by reader 201.

Figure 2B:
Figure 2C:
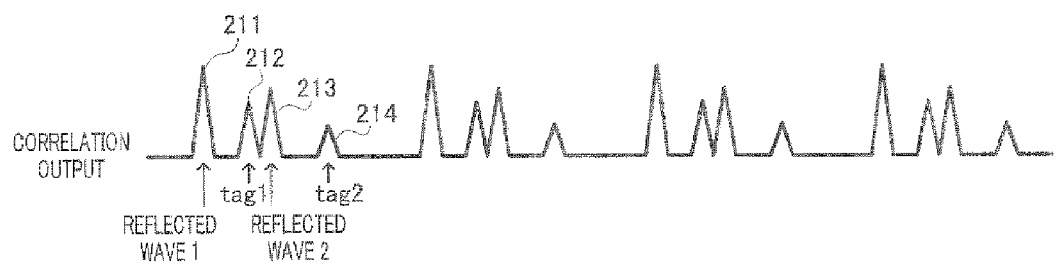

A transmission signal transmitted by reader 201 has periodically sent pulse train 210 as shown in FIG. 2(b). On the other hand, in a delay profile of a signal received by reader 201, peak 211 indicating a reflected wave from nearby reflecting object 205, peak 212 indicating a reflected wave from TAG1, peak 213 indicating a reflected wave from distant reflecting object 206, and peak 214 indicating a reflected wave from TAG2, are detected, as shown in FIG. 2(c). Although FIG. 2(c) is only an example, as shown in this drawing it is possible for peak 211, which is a first traveling wave of the highest level, not to be a reflected wave from a desired tag (a signal to which a TAG1 tag ID has been added).

In the case shown in FIG. 2(c), since first traveling wave 211 is a reflected wave from nearby reflecting object 205, it is necessary to eliminate this signal. Also, since there are a plurality of tags, it is necessary for a reflected wave to which a desired tag ID has been added (peak 212) to be separated from a reflected wave to which another tag ID has been added (peak 214) by using their delay times.

Figure 3:
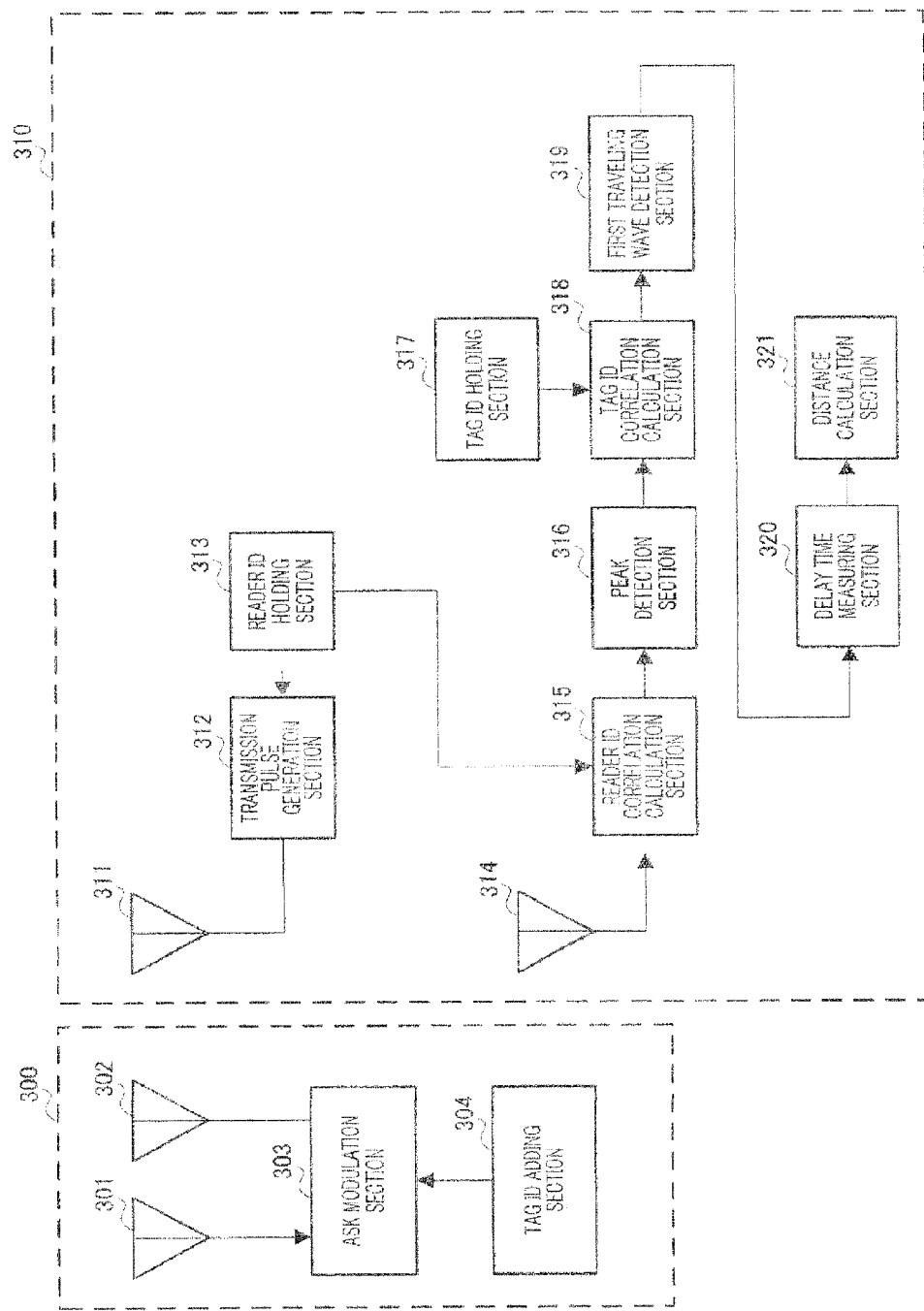
FIG. 3 is a block diagram showing the configuration of a distance measuring apparatus according to Embodiment 1 of the present invention.

FIG. 3 is a block diagram showing the configuration of a distance measuring apparatus according to an embodiment of the present invention. In FIG. 3, tag 300 has tag receiving antenna 301 and tag transmitting antenna 302. These antennas may be made common by using a power divider, circulator, or the like. A transmission signal sent from reader 310, such as an IR-UWB pulse train signal, for example, is received by tag receiving antenna 301.

First, the operation of tag 300 will be described. Tag ID adding section 304 of tag 300 holds a tag ID assigned to each tag as a unique identification ID by means of memory or wired logic. ASK modulation section 303 reads a tag ID held in tag ID adding section 304, and performs ASK modulation (Amplitude Shift Keying Modulation) on a pulse train signal received from a reader using a code string (composed of "0" bits and "1" bits) representing a tag ID. Tag 300 sends a signal obtained by means of ASK modulation from tag transmitting antenna 302. This ASK modulation section 303 operation is similar to an operation whereby a general passive tag or semi-passive tag returns its own tag ID to a reader by performing ASK modulation on continuous carriers from a reader.

In this embodiment, tag 300 performs ASK modulation on a pulse train signal from reader 310 using a tag ID as described below. Specifically, for "1" bits in a tag ID code string, a pulse train transmitted from a reader is returned as is, while for "0" bits in a tag ID code string, a pulse train transmitted from a reader is not returned. Switching between returning and not returning a pulse train in this way can be implemented by means of the following method, for example. In the case of a passive system, switching can be implemented by having ASK modulation section 303 switch the tag receiving antenna side between non-matching and matching, or connect or disconnect between the tag receiving antenna and tag transmitting antenna. In the case of a semi-passive system, switching can be implemented by having ASK modulation section 303 turn the power supply of a low noise amplifier (LNA) or power amplifier on and off.

Next, the operation of reader 310 will be described. Reader ID holding section 313 of reader 310 holds a tag ID assigned to each reader as a unique identification ID by means of memory or wired logic. Transmission pulse generation section 312 reads a reader ID held in reader ID holding section 313, and performs OOK (On-Off-Keying) modulation based on a reader ID code string. A pulse train corresponding to a reader ID generated by this means is transmitted periodically from reader transmitting antenna 311 as a transmission signal.

Reader receiving antenna 314 receives a reflected signal (including a pulse train) to which a tag ID has been added, returned from tag 300. Reader ID correlation calculation section 315 performs sliding autocorrelation processing between a reflected signal received by reader receiving antenna 314 and a reader ID read from reader ID holding section 313, and generates a plurality of delay profiles corresponding to each period. Generated delay profiles are output to peak detection section 316.

Peak detection section 316 performs peak search for the plurality of delay profiles output from reader ID correlation calculation section 315, and extracts a reflected wave that is an unwanted wave, and reflected signals sent from a plurality of tags. The extracted reflected wave and reflected signals sent from a plurality of tags are output to tag ID correlation calculation section 318.

Tag ID holding section 317 holds a plurality of tag IDs associated with reader 310 beforehand by means of memory or wired logic. Tag ID correlation calculation section 318 reads a desired tag ID from among the plurality of tag IDs held in tag ID holding section 317, and performs correlation processing between a read tag ID and a signal output from peak detection section 316. By means of this correlation processing, tag ID correlation calculation section 318 identifies a delay profile that matches a desired tag ID, and detects a group of peaks of a specific delay time.

If a plurality of peaks are obtained that have a delay profile with a significant correlation to a desired tag ID, first traveling wave detection section 319 detects a peak (tag ID first traveling wave) of a delay profile with the shortest delay time, and outputs the detected peak to delay time measuring section 320.

Delay time measuring section 320 compares reference timing at which a transmission signal was sent to a tag and timing at which a reflected signal was received from the tag, and extracts a delay time—that is, a time required for a signal transmitted from reader 310 to be received again by reader 310 via tag 300. The extracted delay time is output to distance calculation section 321.

Distance calculation section 321 uses the delay time output from delay time measuring section 320 to calculate the distance between the tag and the reader.

FIG. 4 is a drawing showing an example of a transmission format transmitted by reader 310 shown in FIG. 3. FIG. 4(a) shows a pulse train transmitted from reader transmitting antenna 311. This is a pulse train generated by transmission pulse generation section 312 performing OOK modulation based on a code string of a reader ID held in reader ID holding section 313. By this means, a pulse train corresponding to a reader ID is transmitted periodically.

In FIG. 4(a), a case is assumed in which a reader ID is represented using 128 pulses, but there is no particular restriction on the number of pulses as long as it enables a plurality of reader IDs to be uniquely differentiated. The basis for deciding the number of pulses corresponds to the number of readers in the system. Also, if it is necessary to obtain signal processing gain as a reader ID, a PN code or GOLD code with high autocorrelation is used. Here, a sequence of 128 pulses representing a reader ID is called a unique word (hereinafter referred to as "UW"). As shown in FIG. 4(b), n UWs (where n is greater than or equal to 2) are always processed as a set. Here, this set is called a frame.

The reason for processing n (in this embodiment, 16) UWs in one frame as a set will now be explained. The master clocks that are references for reader and tag operations are not phase-synchronized—that is, they are asynchronous. Also, slight frequency error occurs. Therefore, a tag that receives a transmission signal from a reader does not necessarily send a tag ID added to a reflected signal synchronized with a UW contained in a transmission signal from a reader.

Also, the pulse width of a UWB pulse train is the same as a transmission clock period, and oversampling is not possible. Therefore, in order to perform dependable sampling of a reflected wave from a tag, it is desirable to phase-shift the reception sampling timing with respect to the transmission clock period before sampling a reflected wave. In particular, when pulse frequency bandwidth is limited in IR-UWB, a received signal waveform has more of a triangular wave shape than a square wave, and therefore performing sampling after phase-shifting a received signal is effective.

This can be implemented by giving a reader a configuration that enables a phase-shifted received signal to be sampled. That is to say, a set composed of n UWs is sent an integral number of times to enable a received signal to be sampled after being phase-shifted an integral fraction of a transmission clock period at a time. For example, if the amount of phase shift is made ⅛ of a clock period, multiplication is performed by 2 corresponding to asynchronism of a reader and tag, and by 8 corresponding to the phase shift, so that n=2×8=16 UWs are transmitted as one set. A continuous signal of such a set is a frame shown in FIG. 4(c).

A tag performs 1-bit ASK modulation on one such frame. For example, when a tag transmits a 128-bit tag ID, it is necessary to transmit a continuous signal of a pulse train composed of 128 frames. FIG. 4(d) represents 128 frames necessary for transmitting a tag ID as one burst. A tag can transmit a tag ID once using one burst. The number of frames composing one burst is not limited to 128, as long as all the bits composing a tag ID can be transmitted.

Thus, a reader repeatedly transmits a pulse train of 128 pulses×16 UWs×128 frames per burst, and can perform tag ID processing using this burst. The transmission clock always has a fixed period in order to provide a time reference, but since sampling is performed by means of a phase shift clock in reception operations, although the frequency is the same for the transmission clock and reception clock, the timing (phase) is different.

Figure 5:
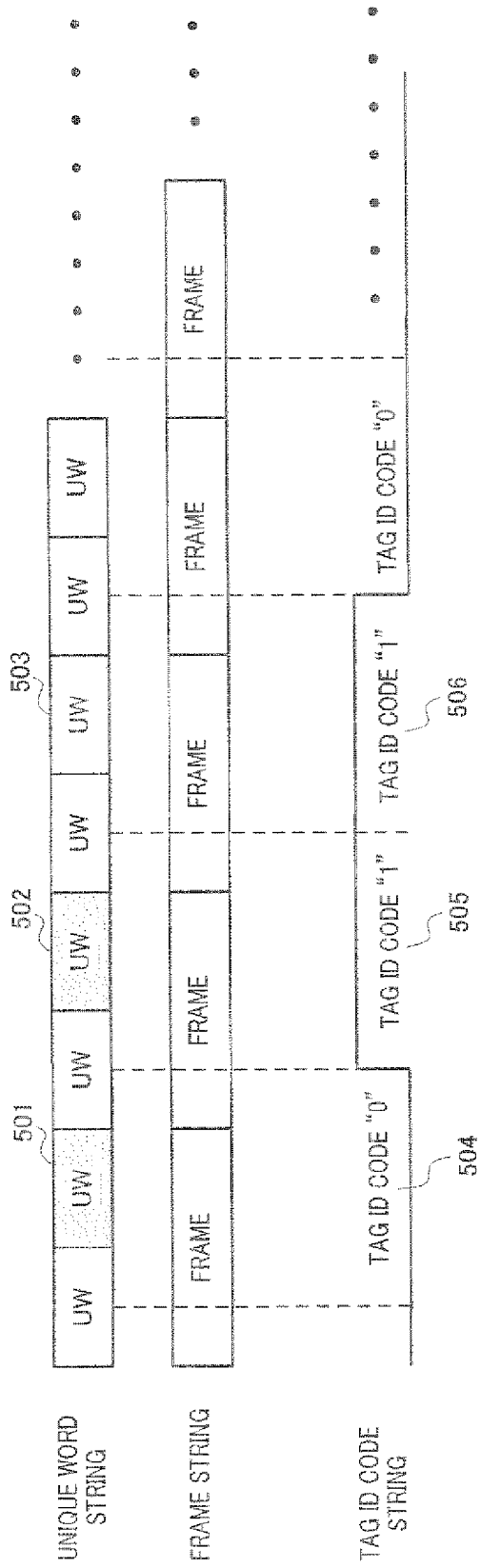
FIG. 5 is a drawing showing an example of a transmission format of a tag.

FIG. 5 is a drawing showing an example of a transmission format of a tag. In FIG. 5, for convenience of explanation, a case is shown in which reception sampling phase shifting is not performed—that is, a case in which one frame comprises two UWs. As explained above, a tag and a reader are asynchronous, and therefore there is not a single fixed timing for tag ID transmission by a tag.

In the example shown in FIG. 5, it is assumed that, at the UW 501 timing, tag ID code "0" (504) equivalent to a start bit is added by tag 300, and this is transmitted to reader 310 as a reflected signal. One bit contained in a code string composing a tag ID is transmitted with a length of one frame—that is, here, two UWs. Therefore, even if the transmission timing of a frame transmitted by a reader and the transmission timing of a tag ID transmitted by a tag are out of synchronization, the timing of either the first or second of the two UWs in a frame coincides with a code change point of a tag ID code ("0" bit or "1" bit). However, since the UW at the other timing does not coincide with a code change point, a signal representing a "1" bit or "0" bit contained in a code string composing a tag ID is transmitted ASK-modulated in one UW. Therefore, if there is no tag ID change point in one UW section, a tag ID code is transmitted with the reader and tag regarded as being synchronized, and the reader determines that a tag ID code synchronized with a UW has been transmitted, and detects a tag ID code corresponding to this UW. On the other hand, if there is a tag ID change point in one UW section, this is regarded as an unsynchronized UW, and the reader does not use this UW in tag ID code detection.

In the case shown in FIG. 5, the tag ID transmission timing can be regarded as being synchronized with second-half UW 501 in one frame. Therefore, if the reader performs correlation processing on this UW, the reader can detect a tag ID code composing a tag ID. Thereafter, tag ID transmission timings are similarly regarded as being synchronized with second-half UWs 502 and 503 in their respective frames for tag ID code "1" (505) and tag ID code "1" (506). Depending on the timing at which a tag ID code rises (changes from "0" to "1"), a tag ID regarded as being synchronized with a first-half UW may also be transmitted. In reader reception processing corresponding to this FIG. 5, reader ID correlation calculation section 315 performs correlation processing on a UW, and peak detection section 316 determines whether synchronization is to be regarded as being with a first-half UW, or whether synchronization is to be regarded as being with a second-half UW.

Figure 6A:
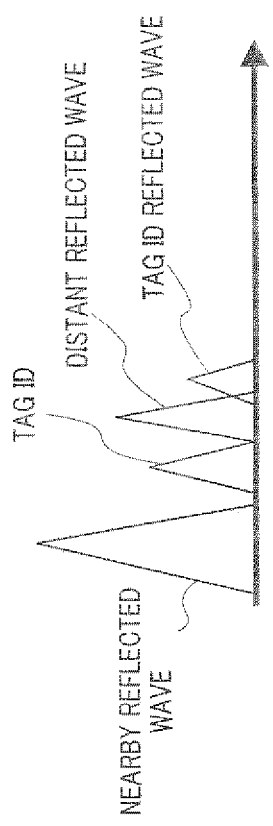
FIG. 6 is a drawing showing the relationship between a burst string and a delay profile.

FIG. 6 is a drawing showing the relationship between a burst string and a delay profile. It is assumed that a reader monitors delay profiles of a nearby reflected wave, a tag ID transmission wave, a distant reflected wave, and a reflected wave resulting from a tag ID reflected wave being reflected by a wall or the like, as shown in FIG. 6(a).

Figure 6B:
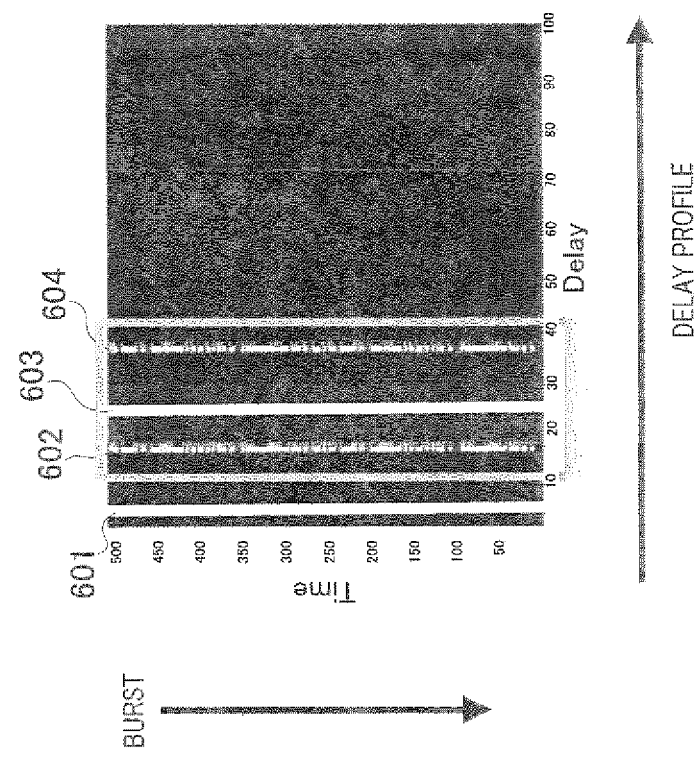

In FIG. 6(b), reference code 601 indicates a nearby reflected wave burst string detection result, reference code 602 indicates a tag ID transmission wave burst string detection result, reference code 603 indicates a distant reflected wave burst string detection result, and reference code 604 indicates a tag ID reflected wave burst string detection result. Since 601 and 603 are reflected waves from a reflecting object, signal amplitude fluctuation does not occur in a burst string. In contrast, 602 and 604 are signals in which an ID transmitted from a tag has been added by means of ASK modulation, amplitude fluctuation corresponding to a tag ID appears in frame units, and a bar code shaped detection result is obtained. Tag ID correlation calculation section 318 finds a correlation with a tag ID for this result in the burst direction, and if a correlation can be obtained, takes detection results 602 and 604 to be candidate bursts. Next, first traveling wave detection section 319 detects a delay profile first traveling wave among the candidate bursts as 602. Delay time measuring section 320 calculates delay profile transmission reference timing and the detection time of a desired tag ID that is first traveling wave detection section 319 output, and measures the delay time.

Figure 7:
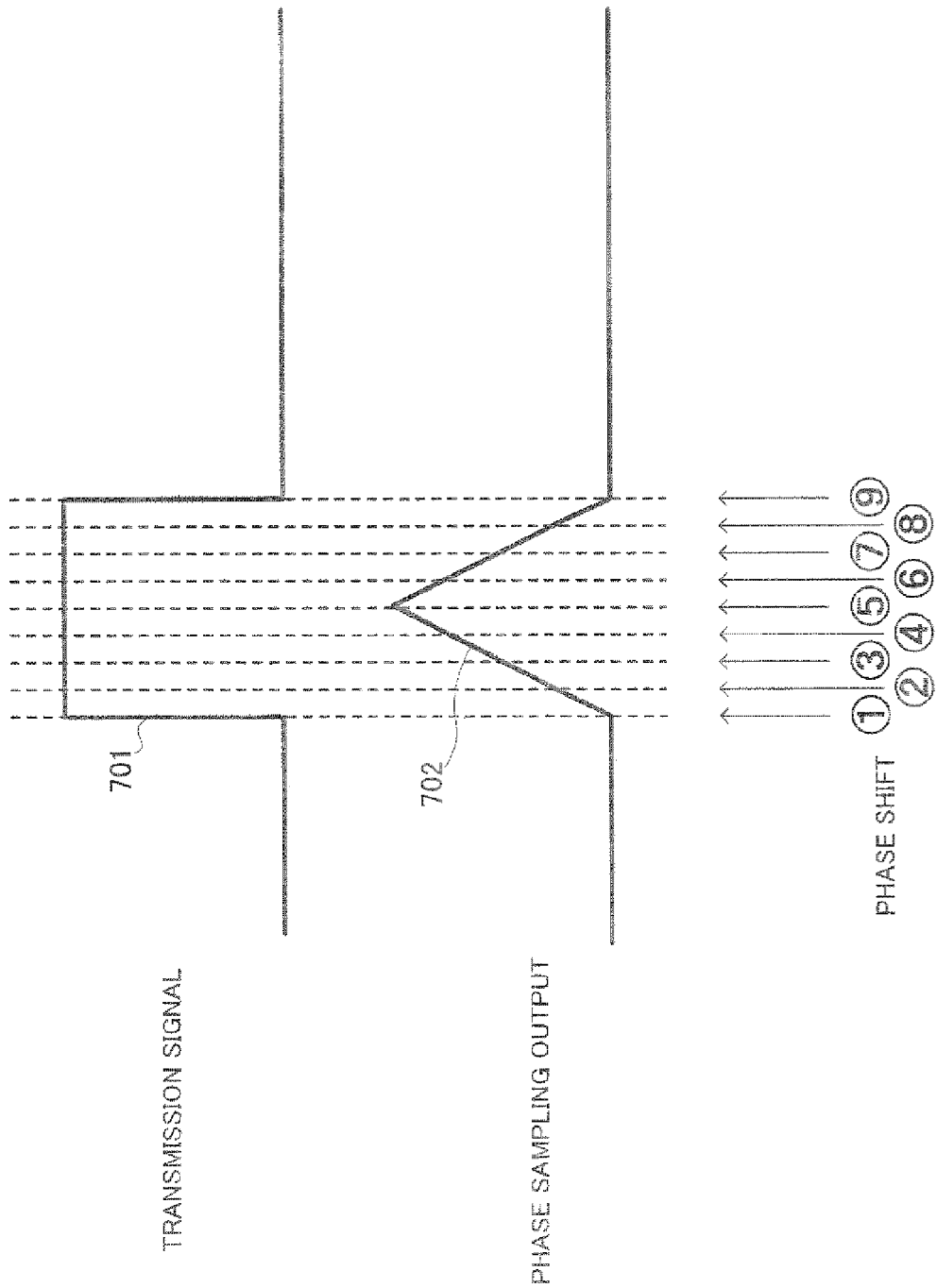
FIG. 7 is a drawing showing a phase shift sampling operation.

FIG. 7 is a drawing showing a phase shift sampling operation. In FIG. 7, reference code 701 indicates the waveform of a transmission signal from a reader, and reference signal 702 indicates the waveform of a signal received by a reader. Here, 702 differs from 701 due to a UWB band limitation, and the signal amplitude also differs. In FIG. 7, phase shifts 1 through 8 indicate sampling timings, and these timings are different for each reception. Consequently, in this embodiment, reader ID correlation calculation section 315 increases power by adding all 8 phase components before finding a signal correlation with its reader. Here, sampling is performed at timings phase-shifted by ⅛ each time, but this fraction is not limited to ⅛.

Thus, according to Embodiment 1, by using a reader ID represented by a code string composed of P bits (where P is a natural number) for identifying a base station and a tag ID represented by a code string composed of Q bits (where Q is a natural number) for identifying a radio terminal, generating a unique word containing P pulses, each of which is on/off modulated according to whether each of the P bits representing the reader ID is 1 or 0, generating a frame containing 2×M unique words, generating a burst containing Q frames, outputting a transmission signal containing a plurality of bursts, and performing sampling reception of a signal resulting from ASK modulation of the transmission signal by the radio terminal based on whether each of the Q bits representing the tag ID is 1 or 0 at timings with a phase difference of 1/M (where M is an integer not smaller than 1) of a transmission clock period, a reader can easily distinguish between a reflected signal from a desired tag and an unwanted wave, enabling distance measurement accuracy to be improved, even when a UWB signal is used for distance measurement.

Embodiment 2

Figure 8:
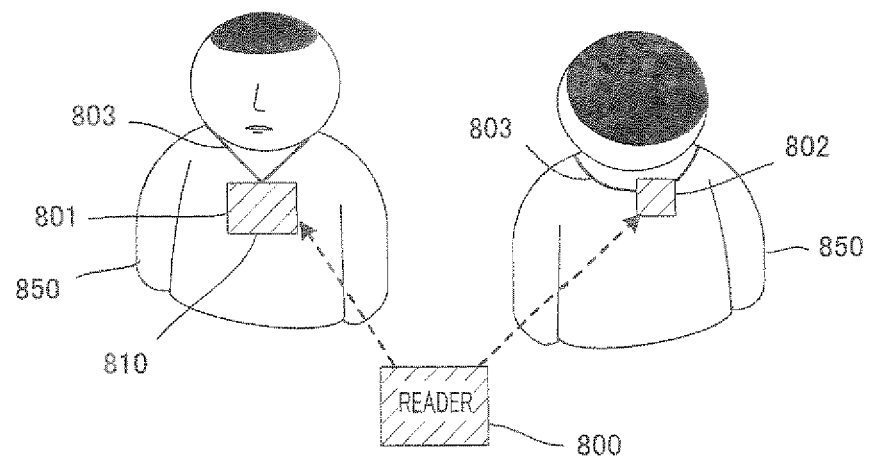
FIG. 8 is a drawing showing the overall configuration of a radio distance measuring system according to Embodiment 2 of the present invention.

FIG. 8 is a drawing showing the overall configuration of a radio distance measuring system according to Embodiment 2 of the present invention. The radio distance measuring system has reader 800, first tag 801, and second tag 802. First tag 801 is mounted on the surface of name tag 810 worn by person 850, and second tag 802 is attached to neck-encircling cord 803, which is connected to this name tag 810, at a position different from that at which the name tag is connected. Second tag 802 is attached, for example, to a middle part of neck-encircling cord 803. When person 850 puts on name tag 810, if neck-encircling cord 803 is arranged so that name tag 810 hangs down in front of the chest of person 850, second tag 802 is positioned at the rear of the neck, and therefore first tag 801 is positioned facing forward from the body, and second tag 802 is positioned facing rearward from the body.

Figure 9:
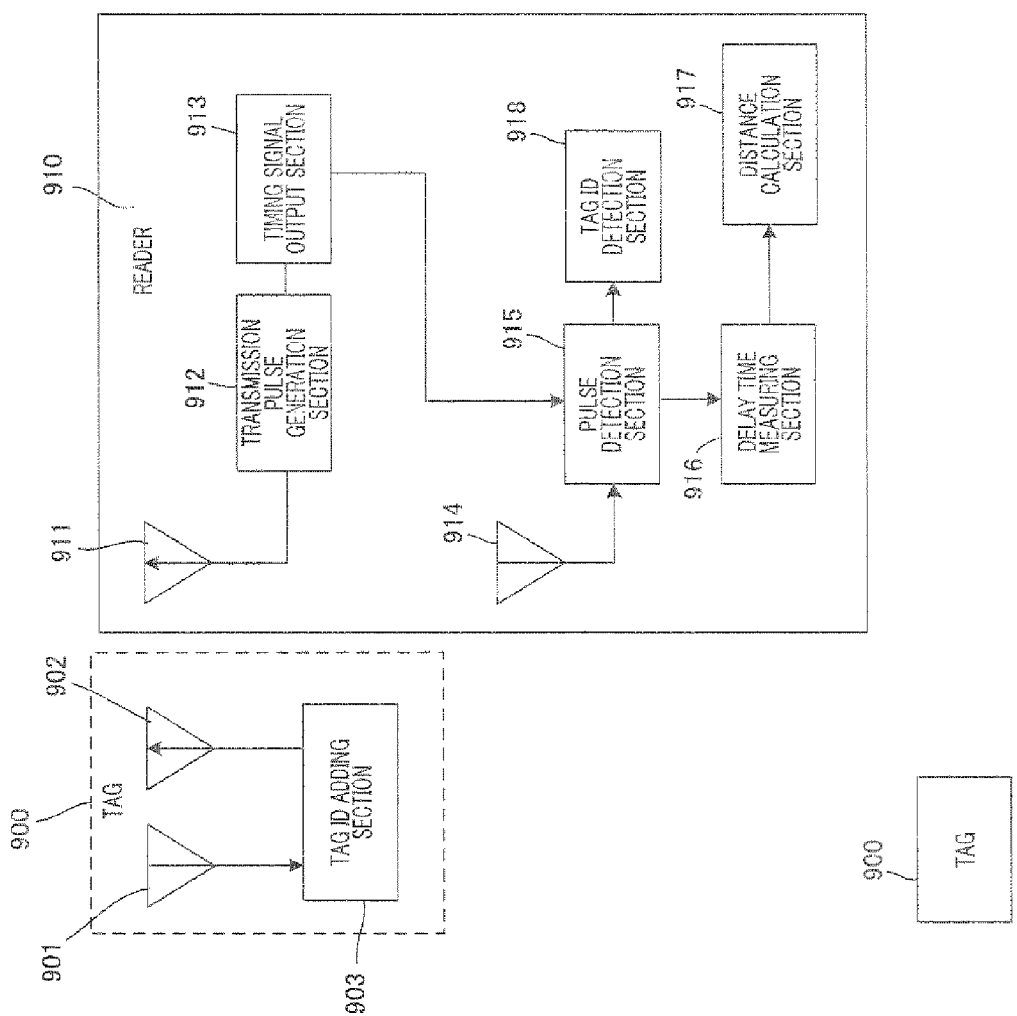
FIG. 9 is a block diagram showing the functional configuration of a reader and tag according to Embodiment 2 of the present invention.

FIG. 9 is a block diagram showing the configuration of a reader and tag according to Embodiment 2 of the present invention. The configuration and operation of a radio distance measuring system using a reader and tag will now be described. Reader 800 is a radio apparatus using UWB that can be applied to an active, passive, or semi-passive distance measuring system. In FIG. 9, a semi-passive configuration is shown as an example.

Tag-to-reader distance measurement using a tag and reader is performed using the propagation time of a measurement signal transmitted/received between the tag and the reader. The distance between the tag and the reader can be found by calculating the propagation time of the measurement signal, and performing integration of that propagation time and the propagation velocity of a radio wave. In the case of either a passive or semi-passive tag, a transmission radio wave from a reader is reflected or amplified and re-emitted, and transmits a tag ID as an identification ID of the tag. By this means, the round-trip time of a measurement signal going back and forth between the tag and the reader can be calculated based on an absolute reference time counted inside the reader.

In FIG. 9, tag 900 is provided with receiving antenna 901, transmitting antenna 902, and tag ID adding section 903. Also, reader 910 is provided with transmitting antenna 911, transmission pulse generation section 912, timing signal output section 913, receiving antenna 914, pulse detection section 915, tag ID detection section 918, delay time measuring section 916, and distance calculation section 917.

In reader 910, timing signal output section 913 generates and outputs a reference timing signal receive timing signal, and transmission pulse generation section 912 generates a measurement UWB pulse according to the timing signal and emits this into space from transmitting antenna 911.

Tag 900 receives UWB pulses at receiving antenna 901, and performs modulation on the UWB pulses using a tag ID unique to each tag in tag ID adding section 903. By this means, an identification ID being ID information for tag identification of this apparatus is added, and is sent from transmitting antenna 902.

Reader 910 receives a signal returned from tag 900 at receiving antenna 914, and detects UWB pulses in pulse detection section 915. Tag ID detection section 918 detects a tag ID from the UWB pulses, and performs individual recognition of a person wearing a tag. Then delay time measuring section 916 measures a delay time of a UWB pulse returned by tag 900, taking a timing signal output section 913 timing signal as a reference, and distance calculation section 917 calculates the distance between the tag and the reader based on the measured UWB pulse delay time.

In the case of an active system, a tag sends measurement signal containing ID information at timing synchronized with the reader beforehand, or, if the tag and reader are not synchronized, synchronizes the clocks of a plurality of readers, and a measurement signal containing ID information is sent from the tag to a plurality of readers, and the difference in the times required for this measurement signal to arrive is found. By this means, tag-to-reader distance measurement can be performed from a relative propagation time (propagation time difference) in each reader.

If there are a plurality of readers, a tag position can be measured using the principle of trilateration. Also, if a reader has a function for measuring the direction of arrival of a radio wave, a tag position can be measured from the direction of arrival of a radio wave and the tag-to-reader distance even if there is a single reader.

As stated above, in a radio distance measuring system that uses UWB, in a shadow area that is not in a visible area as viewed from a reader, a transmission signal from a tag is greatly attenuated due to shielding/absorption effects of the human body. Consequently, in this embodiment, when tags are attached to a plurality of human bodies, and human bodies to which tags are attached are in various attitudes, tags are configured so that a single tag or a plurality of tags are always positioned in a visible area on a human body as viewed from a reader—that is, in positions such that at least one tag can be seen from a reader. Then a reader detects at least one tag among the plurality of tags, or performs reader-to-tag distance measurement based on a reader ID.

In this embodiment, a case will be described by way of example in which a plurality of tags have the same tag ID. As shown in FIG. 8, first tag 801 is mounted on the surface of name tag 810. A tag ID is assigned to this first tag 801 as ID information for performing individual recognition of a person wearing name tag 810. When first tag 801 enters a reader 800 reception area, a signal containing a tag ID is transmitted from first tag 801 to reader 800. On the other hand, second tag 802 is attached to the middle part of neck-encircling cord 803 connected to name tag 810, for example. When a person puts on name tag 810, second tag 802 is positioned so as to be in contact with the back of the person's neck, so that second tag 802 is mounted on the rear side of the person in contrast to name tag 810 on which first tag 801 is mounted. Here, second tag 802 also has a tag ID having the same ID as first tag 801.

Reader 800 detects a tag ID from a signal transmitted from first tag 801 or second tag 802, and recognizes an individual ID of a person wearing a first tag and second tag. At this time, either first tag 801 or second tag 802 is facing in the direction of reader 800, and therefore a tag ID is detected by selecting or combining a plurality of signals transmitted from a plurality of tags. In the identification of ID information, reader 800 performs individual recognition by reading a tag ID, monitoring the reliability of a read ID by means of the signal level or the like, and performing determination as a tag ID using high-reliability data. Also, in tag-to-reader distance calculation, in order to perform measurement using a radio wave that arrives by the shortest route, distance measurement is performed by detecting a first traveling wave for an ID regarded as being the same as an identified tag ID. Making the tag IDs of a plurality of tags the same ID makes an adding function unnecessary when a plurality of tags are handled by a reader.

Although the characteristics of the two tags in the above configuration have not been specifically described, when tags are attached to a name tag and a cord, for example, the name tag has a larger area than the cord. Consequently, a name tag enables the freedom of design of a tag—with regard to antennas, for instance—to be increased, thereby enabling an improvement in transmission power to be achieved. Also, in this case, reliability can be improved by having a reader preferentially identify a radio wave transmitted from a tag of a name-tag as a tag ID. Here, a tag attached to a name tag and a tag attached to a cord can be differentiated by providing a flag in a data section that contains ID information.

In this embodiment, a plurality of tags have been described as having the same tag ID, but provision may also be made for them to have different tag IDs. When ID information differs for each tag, if information indicating that a plurality of tag IDs have been added is registered for a person wearing a tag beforehand, performing the same kind of processing as the processing for tags having the same ID described above enables an equivalent operational effect to be obtained. Also, as explained above, in a case in which the ID of a tag attached to a name tag is to be detected preferentially, for example, it is only necessary for the tag ID of a name tag to be registered beforehand, and for a reader to perform processing preferentially for that ID.

Also, in this embodiment, a configuration example has been shown in which a second tag is attached to the cord of a name tag, but a second tag may also be located on the collar or the like of an article of clothing worn by a person. For example, when a wearer is decided, as in the case of work clothes in a factory or the like, the same kind of operational effect can be obtained if a tag having the same ID as a name tag is sewn beforehand onto a rear part of the clothing, such as the collar.

Thus, according to Embodiment 2, shielding/absorption effects of the human body can be reduced, and identification ID transmission/reception, distance measurement, and positioning between a tag and a reader can be implemented with high reliability when using UWB radio or the like that is characterized by large human-body absorption loss.

Embodiment 3

Figure 10:
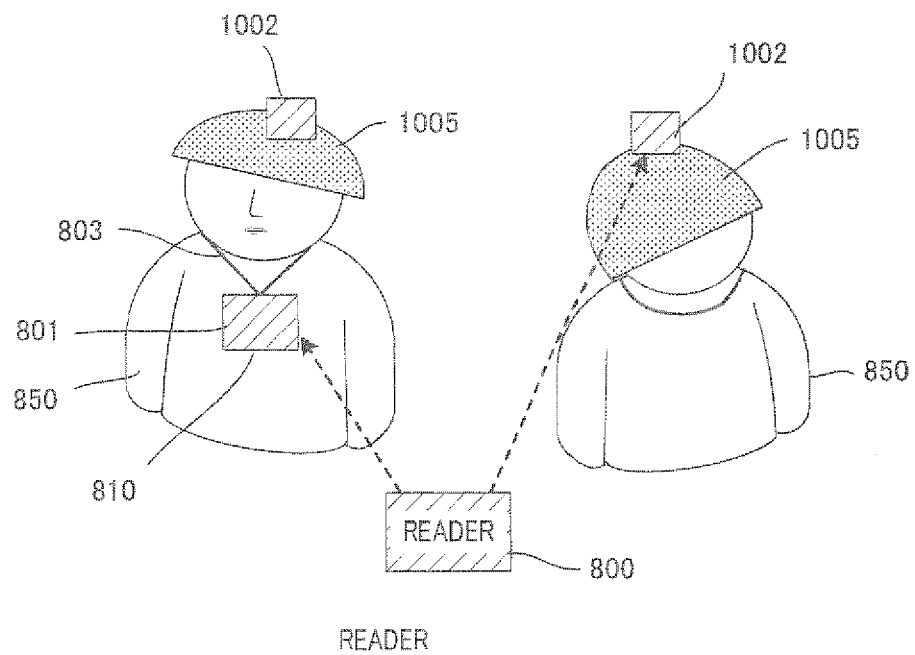
FIG. 10 is a drawing showing the overall configuration of a radio distance measuring system according to Embodiment 3 of the present invention.

FIG. 10 is a drawing showing the overall configuration of a radio distance measuring system according to Embodiment 3 of the present invention. Embodiment 3 is an example in which a tag is located on a person's head.

This radio distance measuring system has reader 800, first tag 801, and second tag 1002 As in Embodiment 1, first tag 801 is mounted on the surface of name tag 810 worn by person 850. Second tag 1002 is attached to helmet 1005 worn on the head of person 850. In the example shown in FIG. 10, second tag 1002 is attached to the top of helmet 1005. When the person is wearing helmet 805, second tag 1002 is positioned at the crown, and second tag 1002 is positioned so as to be visible from all directions, including a direction rearward from the body outside the area of visibility of name tag 810 on the front of the body.

Since helmet 805 is at the very top of the body, there are few situations in which it is in shadow, and in order to protect a person's head from the shock of a collision with an object, helmet 805 is worn at a slight distance from the top of the head. Consequently, in Embodiment 3, shielding/absorption effects of the human body, and characteristic degradation due to the effects of the human body on an antenna, are further reduced. In Embodiment 3, second tag 8 is normally the main tag for ID acquisition and distance measurement, but a case in which a person takes off helmet 805 is also envisaged, and in this case ID acquisition and distance measurement are mainly performed by first tag 801.

Embodiment 4

Figure 11:
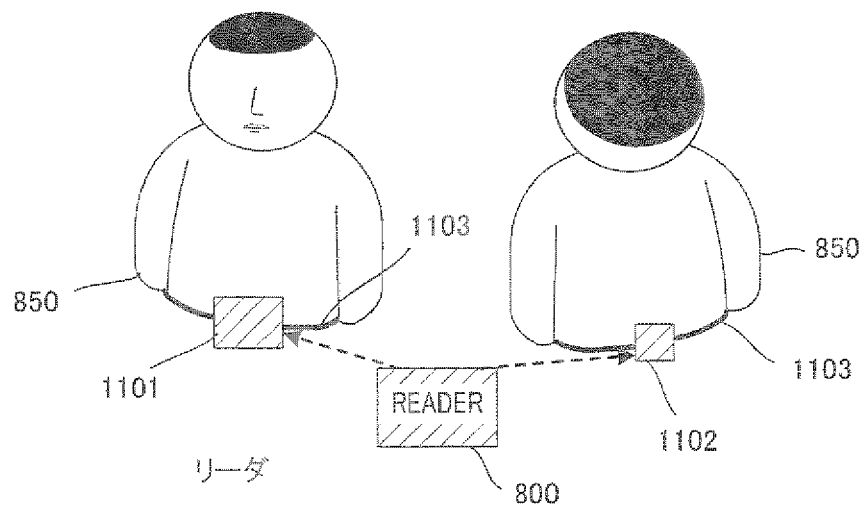
FIG. 11 is a drawing showing the overall configuration of a radio distance measuring system according to Embodiment 4 of the present invention.

FIG. 11 is a drawing showing the overall configuration of a radio distance measuring system according to Embodiment 4 of the present invention. Embodiment 4 is an example in which tags are located at the front and rear of a person's torso.

This radio distance measuring system has reader 800, first tag 1101, and second tag 1102. First tag 1101 is mounted on the buckle part or the like of waist belt 1103 worn by person 850, and second tag 1102 is attached to this waist belt 1103 at a different position, such as the middle part of the belt. When person 850 is wearing waist belt 1103, first tag 1101 and second tag 1102 are positioned at the front and rear of waist belt 1103, with first tag 1101 located facing forward from the body, and second tag 1102 located facing rearward from the body.

By being mounted on the buckle part, for example, at the front of the waist belt, first tag 1101 is attached at a position corresponding to a person's abdominal area. A tag ID is assigned to this first tag 1101 as ID information for performing individual recognition of a person wearing waist belt 1103, and when first tag 1101 enters a reader 800 reception area, a signal containing a tag ID is transmitted from tag 1101 to reader 800. On the other hand, since second tag 1102 is attached to the middle part of waist belt 1103 so as to be attached at a position corresponding to the person's back or lower-back area, and is thus mounted on the rear side of the person in contrast to first tag 1101. Here, second tag 1102 also has a tag ID having the same ID as first tag 1101.

Reader 800 detects a tag ID from a signal transmitted from first tag 1101 or second tag 1102, and recognizes an individual ID of a person wearing a first tag and second tag. At this time, either first tag 1101 or second tag 1102 faces in the direction of reader 800. In the identification of ID information, reader 800 reads a tag ID, monitors the reliability of a read ID by means of the signal level or the like, and determines a high-reliability item to be a tag ID. In Embodiment 4, first tag 1101 and second tag 1102 are integrated via waist belt 1103 and are always attached to the front and rear of the body, achieving an effect of reducing shielding/absorption effects.

In this embodiment, an example has been shown in which two tags are provided, but provision may also be made for two or more tags having the same ID to be attached at two or more places around a belt—for example, for three, four, or more tags to be attached to a belt at regular intervals. In this case, characteristic degradation due to shielding/absorption effects of the human body is further reduced. Also, by combining tags attached to a name tag and cord as shown in Embodiment 2 with the tags attached to a belt in FIG. 4, it is also possible to reduce propagation degradation due to a difference in vertical height. In this embodiment, a waist belt has been taken as an example, but provision may also be made for a first tag and second tag to be attached to the front and rear of a person using suspenders or the like.

Embodiment 5

Figure 12:
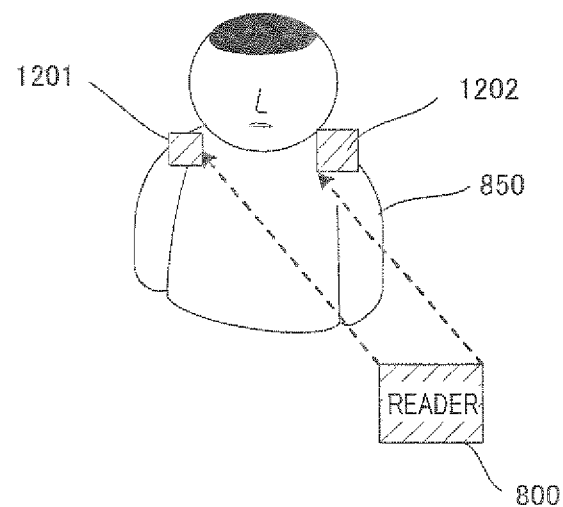
FIG. 12 is a drawing showing the overall configuration of a radio distance measuring system according to Embodiment 5 of the present invention.

FIG. 12 is a drawing showing the overall configuration of a radio distance measuring system according to Embodiment 5 of the present invention. Embodiment 5 is an example in which a tag is located on each shoulder of a person.

This radio distance measuring system has reader 800, first tag 1201, and second tag 1202. First tag 1201 is attached to one shoulder of an article of clothing worn by person 850, and second tag 1202 is attached to the other shoulder. When person 850 is wearing this article of clothing, first tag 1201 and second tag 1202 are positioned on the two shoulders, with first tag 1201 located facing toward the right of the body, and second tag 1202 located facing toward the left of the body. Here, first tag 1201 and second tag 1202 have tag IDs with the same ID.

These first and second tags 1201 and 1202 can be attached, for example, to the left and right shoulder pads of a suit or work uniform jacket, the left and right epaulets of a military uniform, and so forth. When a tag is attached to a shoulder, the antenna directivity pattern of the tag can be expected to form an upper hemisphere face, and shielding/absorption effects of the human body are particularly unlikely to be experienced when reader 800 is above the position of a person's shoulders. However, depending on the positional relationship of a person's head, a reader, and a tag, shielding/absorption of a radio wave may be caused by the head, and therefore shielding/absorption due to the head can be prevented by taking the influence of the head into consideration and attaching tags to both shoulders as in Embodiment 5.

Embodiment 6

Figure 13:
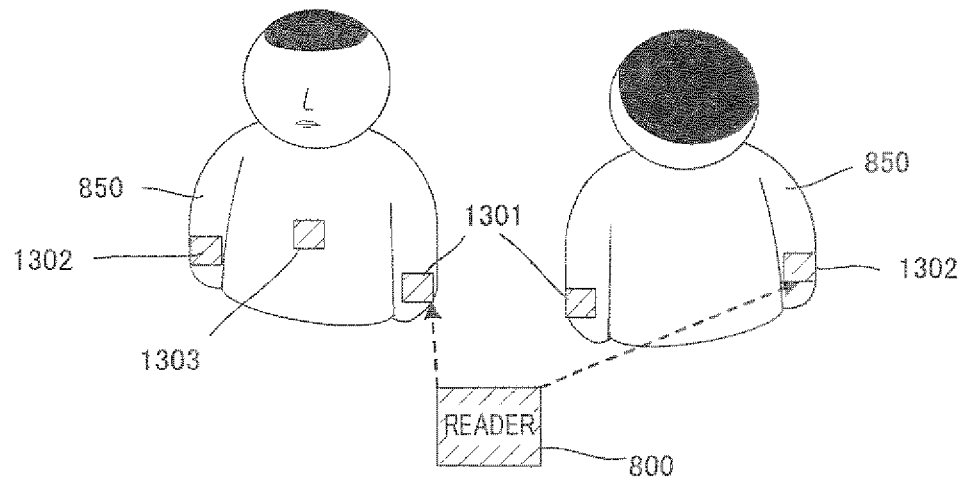
FIG. 13 is a drawing showing the overall configuration of a radio distance measuring system according to Embodiment 6 of the present invention.

FIG. 13 is a drawing showing the overall configuration of a radio distance measuring system according to Embodiment 6 of the present invention. Embodiment 6 is an example in which tags are located on both arms and the chest of a person.

This radio distance measuring system has reader 800, first tag 1301, second tag 1302, and third tag 1303. First tag 1301 is attached to the left arm of an article of clothing worn by person 850, second tag 1302 is attached to the right arm, and third tag 1303 is attached to the chest. When person 850 is wearing this article of clothing, first tag 1301 and second tag 1302 are positioned on the two arms and third tag 1303 on the chest area, with first tag 1301 located facing toward the left of the body, second tag 1302 located facing toward the right of the body, and third tag 1303 located facing forward from the body.

Here, first tag 1301 and second tag 1302 are located, for example, on left and right sleeve buttons, while third tag 1303 is attached to a breast pocket or the like, for example. Provision may also be made for the first tag to be on a left sleeve button, the second tag on a right sleeve button, and the third tag on a name tag. Alternatively, the first tag may be on a left sleeve button, the second tag on a right sleeve button, and the third tag on a front button. Yet another option is for the first or second tag to be attached to a wristwatch.

In the case of Embodiment 6, it can be expected that the antenna directivity pattern of the first tag will form a leftward hemisphere face, the antenna directivity pattern of the second tag will form a rightward hemisphere face, and the antenna directivity pattern of the third tag will form a frontal hemisphere face. By this means, shielding/absorption effects of the human body between a reader and tag can be reduced.

Embodiment 7

Figure 14:
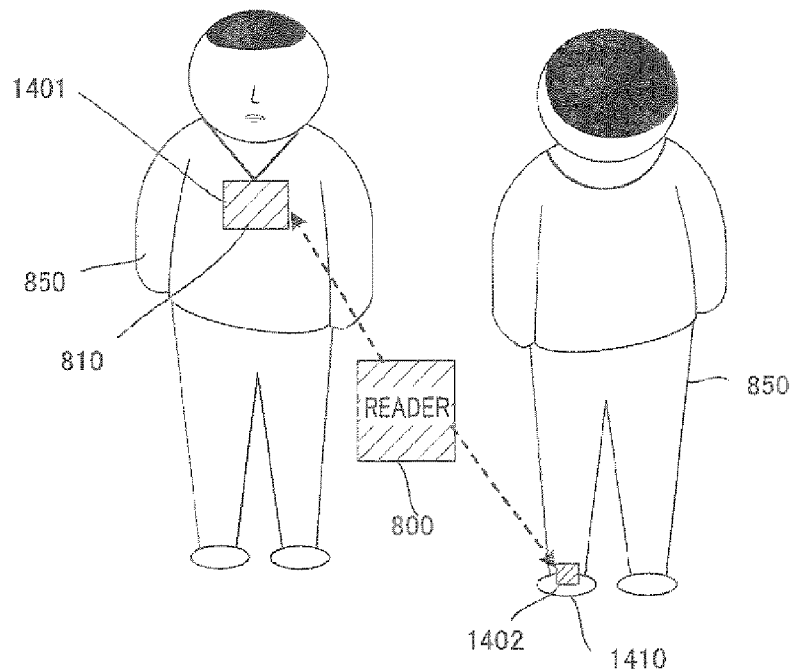
FIG. 14 is a drawing showing the overall configuration of a radio distance measuring system according to Embodiment 7 of the present invention.

FIG. 14 is a drawing showing the overall configuration of a radio distance measuring system according to Embodiment 7 of the present invention. Embodiment 7 is an example in which tags are located on the chest and a foot of a person.

This radio distance measuring system has reader 800, first tag 1401, and second tag 1402. First tag 1401 is attached to name tag 810 worn by person 850, and second tag 1402 is attached to the heel of shoe 1410 worn on one foot. When person 850 is wearing name tag 810 and shoe 1410, first tag 1401 is positioned on the chest and second tag 1402 on one heel, with first tag 1401 located facing forward from the body, and second tag 1402 located facing rearward from the body. Here, first tag 1401 and second tag 1402 have tag IDs with the same ID.

In the case of Embodiment 7, the antenna directivity pattern of the first tag is formed in a forward direction, and the antenna directivity pattern of the second tag is formed in a rearward direction. By this means, when the first tag is present in an opposite direction with respect to the reader, the second tag has its antenna directivity pattern facing in the direction of the reader, and ID acquisition and distance measurement are possible between the reader and the tag. By attaching tags to the chest and heel areas in this way, shielding/absorption effects of the human body between a reader and a tag can be reduced.

In the example shown in FIG. 14, second tag 1402 is attached to the heel of a shoe, but second tag 1402 may also be attached to part of a shoelace. When a tag is attached to a shoelace, it is not necessary to use a special attachment structure for sewing the tag to a shoe or the like, and a tag can easily be attached to an ordinary shoe later. When a tag is located on a shoe, it is also possible to direct the antenna directivity pattern rearward even if the tag is attached to a shoelace.

Embodiment 8

Figure 15:
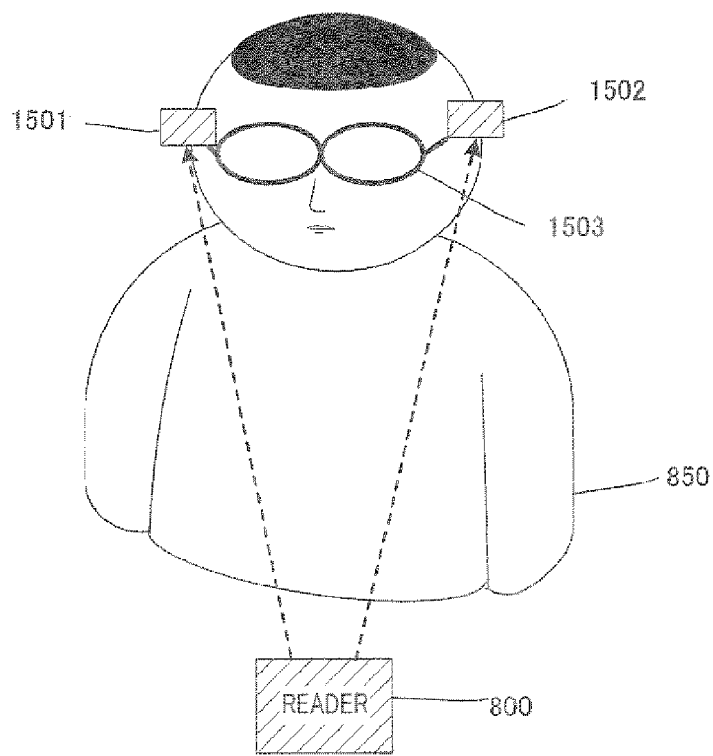
FIG. 15 is a drawing showing the overall configuration of a radio distance measuring system according to Embodiment 8 of the present invention.

FIG. 15 is a drawing showing the overall configuration of a radio distance measuring system according to Embodiment 8 of the present invention. Embodiment 8 is an example in which a tag is located at either side of a pair of glasses worn by a person.

This radio distance measuring system has reader 800, first tag 1501, and second tag 1502. First tag 1501 is attached to a right-hand part of the frame of glasses 1503 worn by person 850, and second tag 1502 is attached to a left-hand part of the frame of those glasses 1503.

In the case of Embodiment 8, it can be expected that the antenna directivity pattern of first tag 1501 will form a rightward hemisphere face, the antenna directivity pattern of second tag 1502 will form a leftward hemisphere face, and shielding/absorption effects of a human head between a reader and tag can be reduced. Apart from ordinary eyeglasses, "glasses" may include ski goggles, protective goggles in the workplace, and so forth.

As described above, in Embodiments 1 through 8, a configuration is used in which a plurality of tags, such as a first tag and second tag having the same ID, are provided at a plurality of places such as at the front and rear or left and right of a person, and the plurality of tags are located in at least two places (preferably two or three places) from among the front, rear, head, foot, left side, and right side, of a person. By locating a plurality of tags on opposite sides of a human body in this way, so as to face in different directions with respect to the human body, at least one tag is located so as to face toward a base station, making it possible for radio communication to be performed between at least one tag and a base station without the intervening presence of a human body. Therefore, shielding/absorption effects of the human body can be reduced, and signal strength degradation due to human-body absorption can be offset. By this means, in a radio distance measuring system comprising UWB reader and tag apparatuses or the like using UWB that is characterized by large human-body absorption loss, high-reliability radio communication is made possible, and tag ID transmission/reception and reader-to-tag distance measurement can be performed dependably.

Technological ideas derived from above-described Embodiments 2 through 8 are as follows.

(1) A radio terminal that is used in a radio distance measuring system provided with a base station and a radio terminal, and that comprises a plurality of tags, wherein the plurality of tags are each capable of transmitting a signal containing an identification ID for performing individual recognition of an attachment object of the radio terminal, and, when the radio terminal is attached to a human body, the plurality of tags are located in at least two places from among the front, rear, head, foot, left side, and right side, of a person (2) The radio terminal described in (1) that performs communication with the base station using ultra wideband (UWB) radio.

(3) The radio terminal described in (1) or (2), wherein the plurality of tags have the same identification ID.

(4) The radio terminal described in any one of items (1) through (3), having a first tag located on the surface of a name tag of a person wearing the radio terminal and a second tag located at the rear of the person, as the plurality of tags, wherein the first tag and the second tag have the same identification ID, and a signal transmitted from the first tag or the second tag is used to perform individual recognition of a person wearing the radio terminal.

(5) The radio terminal described in (4), wherein the second tag is attached to a circular cord, which is connected to the name tag, at a position different from that at which the name tag is connected.

(6) The radio terminal described in any one of items (1) through (3), wherein one of the plurality of tags is located on a helmet worn on the head of a person.

(7) The radio terminal described in any one of items (1) through (3), wherein the radio terminal is located on a waist belt worn by a person, and the plurality of tags are located at different positions when the waist belt is attached to a human body.

(8) The radio terminal described in any one of items (1) through (3), wherein one of the plurality of tags is located on a wristwatch worn on a person's wrist.

(9) The radio terminal described in any one of items (1) through (3), having a first tag located on the right shoulder of a person wearing the radio terminal and a second tag located on the left shoulder of the person, as the plurality of tags, wherein the first tag and the second tag have the same identification ID.

(10) The radio terminal described in any one of items (1) through (3), having a first tag located on a left sleeve button of an article of clothing worn by a person wearing the radio terminal, a second tag located on a right sleeve button, and a third tag located on a front button, as the plurality of tags.

(11) The radio terminal described in any one of items (1) through (3), having a first tag located on the right side of the frame of glasses worn by a person, and a second tag located on the left side of the frame, as the plurality of tags.

(12) The radio terminal described in any one of items (1) through (3), having a first tag located on a name tag of a person wearing the radio terminal, and a second tag attached to the heel of a shoe, as the plurality of tags, wherein the first tag and the second tag have the same identification ID.

(13) The radio terminal described in any one of items (1) through (3), having a first tag located on a name tag of a person wearing the radio terminal, and a second tag located on the collar or the like of an article of clothing worn by the person, as the plurality of tags, wherein the first tag and the second tag have the same identification ID.

(14) The radio terminal described in any one of items (1) through (13), wherein, when the radio terminal is attached to a human body, at least one of the plurality of tags is located in a visible area of the human body.

(15) A base station that is used in a radio distance measuring system provided with a base station and a radio terminal, and has a plurality of tags each capable of transmitting a signal containing an identification ID for performing individual recognition of an attachment object as the radio terminal, and that, when the radio terminal is attached to a human body, performs communication with an item on which the plurality of tags are located in at least two places from among the front, rear, head, foot, left side, and right side, of a person, detects the identification ID contained in a signal transmitted from at least one of the plurality of tags, and measures the distance from the radio terminal based on the detected identification ID.

(16) The base station described in (15) that selects or combines a plurality of signals transmitted from the plurality of tags, and detects the identification ID.

(17) The base station described in (15) or (16) that determines an identification ID using high-reliability data among detection results of the identification IDs contained in a plurality of signals transmitted from the plurality of tags, and performs individual recognition of a person wearing the radio terminal.

(18) The base station described in (15) or (16) that, after determining an identification ID using high-reliability data among detection results of the identification IDs contained in a plurality of signals transmitted from the plurality of tags, and performing individual recognition of a person wearing the radio terminal, measures the distance from the radio terminal using a first traveling wave of signals transmitted from the plurality of tags for an identification ID that is the same as the detected identification ID.

(19) A radio distance measuring system provided with: a radio terminal that comprises a plurality of tags, wherein the plurality of tags are each capable of transmitting a signal containing an identification ID for performing individual recognition of an attachment object of the radio terminal, and, when the radio terminal is attached to a human body, the plurality of tags are located in at least two places from among the front, rear, head, foot, left side, and right side, of a person; and a base station that performs communication with the radio terminal, detects the identification ID contained in a signal transmitted from at least one of the plurality of tags, and measures the distance from the radio terminal based on the detected identification ID.

The present invention is not limited to what is shown in the above-described embodiments, and various variations and modifications may be possible by those skilled in the art based on the specification and known technology without departing from the scope of the present invention.

In the above embodiments, configuration examples have been shown of a radio distance measuring system that has a plurality of tags constituting a radio terminal and a reader constituting a base station as a radio terminal and base station used in a radio distance measuring system, and that uses a UWB radio system, but a radio distance measuring system of this kind is also called a UWB reader/tag apparatus.

In the present invention, it is possible for both a radio terminal and base station to be configured as hardware, or to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosures of Japanese Patent Application No. 2008-262873, filed on Oct. 9, 2008, and Japanese Patent Application No. 2008-274524, filed on Oct. 24, 2008, including the specifications, drawings and abstracts, are incorporated herein by reference in their entirety.

INDUSTRIAL APPLICABILITY

A base station apparatus and distance measuring method according to the present invention are suitable for use in a tag locator with which a remote control, name tag, or the like is provided, and so forth.

The invention claimed is:

1. A base station apparatus in a radio distance measuring system that uses a reader ID and a tag ID, the base station apparatus comprising:
a pulse generation section configured to generate a unique word containing P pulses, each of which is on/off modulated according to whether each of P bits representing the reader ID is 1 or 0, generates a frame containing 2×M unique words, configured to generate a burst containing Q frames, and configured to output a transmission signal containing a plurality of bursts; and
a receiving section configured to perform sampling reception of a signal resulting from modulation of the transmission signal by the radio terminal based on whether each of Q bits representing the tag ID is 1 or 0 at timings with a phase difference of 1/M (where M is an integer not smaller than 1) of a transmission clock period, the transmission clock period being a time period of a length which is the same as a width of each one of the pulses, wherein:

the reader ID is represented by a code string composed of P bits (where P is a natural number) for identifying a base station apparatus, and the tag ID is represented by a code string composed of Q bits (where Q is a natural number) for identifying a radio terminal and detecting a first traveling wave from a tag by means of correlation calculation.

2. The base station apparatus according to claim 1, further comprising a reader ID correlation calculation section configured to perform correlation calculation between the reader ID and a received signal, and configured to generate a delay profile.

3. The base station apparatus according to claim 2, wherein the reader ID correlation calculation section amplifies power by adding all M phase components and performs the correlation calculation.

4. The base station apparatus according to claim 3, wherein a modulation method used by the radio terminal to create the transmission signal is Amplitude Shift Keying (ASK) modulation.

5. The base station apparatus according to claim 2, further comprising:

a tag ID correlation calculation section configured to store the delay profile in a time-series manner, and performs correlation calculation for the stored delay profile and a tag ID of a desired tag comprising Q bits;

a first traveling wave detection section configured to detect a first traveling wave of a tag ID based on a correlation calculation result in the tag ID correlation calculation section;

a delay time measuring section configured to measure a round-trip delay time of the detected first traveling wave; and a distance calculation section configured to calculate a distance between the tag and the reader from the measured round-trip delay time.

6. The base station apparatus according to claim 5, wherein a modulation method used by the radio terminal to create the transmission signal is ASK modulation.

7. The base station apparatus according to claim 2, wherein a modulation method used by the radio terminal to create the transmission signal is Amplitude Shift Keying (ASK) modulation.

8. A distance measuring method in a base station apparatus of a radio distance measuring system that uses a reader ID represented by a code string composed of P bits (where P is a natural number) for identifying the base station apparatus and a tag ID represented by a code string composed of Q bits (where Q is a natural number) for identifying a radio terminal, comprising:

generating a unique word containing P pulses, each of which is on/off modulated according to whether each of P bits representing the reader ID is 1 or 0;

generating a frame containing 2×M unique words;

generating a burst containing Q frames;

outputting a transmission signal containing a plurality of bursts; and performing sampling reception of a signal resulting from Amplitude Shift Keying (ASK) modulation of the transmission signal by the radio terminal based on whether each of Q bits representing the tag ID is 1 or 0 at timings with a phase difference of 1/M (where M is an integer not smaller than 1) of a transmission clock period.

9. The distance measuring method according to claim 8, wherein a modulation method used by the radio terminal to create the transmission signal is Amplitude Shift Keying (ASK) modulation.

* * * * *